(12) United States Patent
Kunkel

(10) Patent No.: US 11,609,304 B2
(45) Date of Patent: Mar. 21, 2023

(54) VEHICULAR FRONT CAMERA TESTING SYSTEM

(71) Applicant: Magna Electronics Inc., Auburn Hills, MI (US)

(72) Inventor: Christof Kunkel, Niedernberg (DE)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 530 days.

(21) Appl. No.: 16/784,344

(22) Filed: Feb. 7, 2020

(65) Prior Publication Data

US 2020/0256951 A1 Aug. 13, 2020

Related U.S. Application Data

(60) Provisional application No. 62/802,267, filed on Feb. 7, 2019.

(51) Int. Cl.
| | |
|---|---|
| *G01S 7/40* | (2006.01) |
| *H04N 17/00* | (2006.01) |
| *H04N 17/02* | (2006.01) |
| *G01S 7/497* | (2006.01) |
| *G07C 5/08* | (2006.01) |

(52) U.S. Cl.
CPC ............ *G01S 7/40* (2013.01); *G01S 7/497* (2013.01); *G07C 5/0808* (2013.01); *H04N 17/002* (2013.01)

(58) Field of Classification Search
USPC ........................................... 348/61, 118, 120
See application file for complete search history.

(56) References Cited

U.S. PATENT DOCUMENTS

| | | | |
|---|---|---|---|
| 5,550,677 A | 8/1996 | Schofield et al. | |
| 5,670,935 A | 9/1997 | Schofield et al. | |
| 5,760,962 A | 6/1998 | Schofield et al. | |
| 5,786,772 A | 7/1998 | Schofield et al. | |
| 5,796,094 A | 8/1998 | Schofield et al. | |
| 5,877,897 A | 3/1999 | Schofield et al. | |
| 5,929,786 A | 7/1999 | Schofield et al. | |
| 5,949,331 A | 9/1999 | Schofield et al. | |
| 6,201,642 B1 | 3/2001 | Bos | |
| 6,222,447 B1 | 4/2001 | Schofield et al. | |
| 6,302,545 B1 | 10/2001 | Schofield et al. | |
| 6,333,631 B1 * | 12/2001 | Das ..................... | G01V 3/15 |
| | | | 250/392 |
| 6,396,397 B1 | 5/2002 | Bos et al. | |
| 6,498,620 B2 | 12/2002 | Schofield et al. | |
| 6,523,964 B2 | 2/2003 | Schofield et al. | |
| 6,587,186 B2 | 7/2003 | Bamji et al. | |

(Continued)

*Primary Examiner* — Daquan Zhao
(74) *Attorney, Agent, or Firm* — Honigman LLP

(57) ABSTRACT

A vehicular test system for testing a vehicular sensing system includes a sensor support structure having a proximal end disposed at a vehicle, a distal end extending away from the vehicle, and a force providing element that provides a force to move the distal end of the sensor support structure. A vehicular sensor is disposed at the distal end of the sensor support structure. When the vehicular sensor is approaching a collision with an object, such as during testing of vehicular sensors and vehicular sensing systems, a control controls the force providing element to move the distal end of the sensor support structure and the vehicular sensor to avoid the collision.

22 Claims, 8 Drawing Sheets

(56) References Cited

U.S. PATENT DOCUMENTS

| | | |
|---|---|---|
| 6,611,202 B2 | 8/2003 | Schofield et al. |
| 6,636,258 B2 | 10/2003 | Strumolo |
| 6,674,895 B2 | 1/2004 | Rafii et al. |
| 6,678,039 B2 | 1/2004 | Charbon |
| 6,690,268 B2 | 2/2004 | Schofield et al. |
| 6,690,354 B2 | 2/2004 | Sze |
| 6,710,770 B2 | 3/2004 | Tomasi et al. |
| 6,717,610 B1 | 4/2004 | Bos et al. |
| 6,757,109 B2 | 6/2004 | Bos |
| 6,802,617 B2 | 10/2004 | Schofield et al. |
| 6,806,452 B2 | 10/2004 | Bos et al. |
| 6,822,563 B2 | 11/2004 | Bos et al. |
| 6,825,455 B1 | 11/2004 | Schwarte |
| 6,876,775 B2 | 4/2005 | Torunoglu |
| 6,882,287 B2 | 4/2005 | Schofield |
| 6,891,563 B2 | 5/2005 | Schofield et al. |
| 6,906,793 B2 | 6/2005 | Bamji et al. |
| 6,919,549 B2 | 7/2005 | Bamji et al. |
| 6,946,978 B2 | 9/2005 | Schofield |
| 7,005,974 B2 | 2/2006 | McMahon et al. |
| 7,038,577 B2 | 5/2006 | Pawlicki et al. |
| 7,053,357 B2 | 5/2006 | Schwarte |
| 7,145,519 B2 | 12/2006 | Takahashi et al. |
| 7,157,685 B2 | 1/2007 | Bamji et al. |
| 7,161,616 B1 | 1/2007 | Okamoto et al. |
| 7,176,438 B2 | 2/2007 | Bamji et al. |
| 7,203,356 B2 | 4/2007 | Gokturk et al. |
| 7,212,663 B2 | 5/2007 | Tomasi |
| 7,230,640 B2 | 6/2007 | Regensburger et al. |
| 7,248,283 B2 | 7/2007 | Takagi et al. |
| 7,283,213 B2 | 10/2007 | O'Connor et al. |
| 7,295,229 B2 | 11/2007 | Kumata et al. |
| 7,301,466 B2 | 11/2007 | Asai |
| 7,310,431 B2 | 12/2007 | Gokturk et al. |
| 7,321,111 B2 | 1/2008 | Bamji et al. |
| 7,340,077 B2 | 3/2008 | Gokturk et al. |
| 7,352,454 B2 | 4/2008 | Bamji et al. |
| 7,375,803 B1 | 5/2008 | Bamji |
| 7,379,100 B2 | 5/2008 | Gokturk et al. |
| 7,379,163 B2 | 5/2008 | Rafii et al. |
| 7,405,812 B1 | 7/2008 | Bamji |
| 7,408,627 B2 | 8/2008 | Bamji et al. |
| 7,592,928 B2 | 9/2009 | Chinomi et al. |
| 7,720,580 B2 | 5/2010 | Higgins-Luthman |
| 7,859,565 B2 | 12/2010 | Schofield et al. |
| 7,881,496 B2 | 2/2011 | Camilleri et al. |
| 8,013,780 B2 | 9/2011 | Lynam |
| 8,027,029 B2 | 9/2011 | Lu et al. |
| 8,694,224 B2 | 4/2014 | Chundrlik, Jr. et al. |
| 8,818,042 B2 | 8/2014 | Schofield et al. |
| 8,886,401 B2 | 11/2014 | Schofield et al. |
| 8,917,169 B2 | 12/2014 | Schofield et al. |
| 9,036,026 B2 | 5/2015 | Dellantoni et al. |
| 9,068,390 B2 | 6/2015 | Ihlenburg et al. |
| 9,077,098 B2 | 7/2015 | Latunski |
| 9,077,962 B2 | 7/2015 | Shi et al. |
| 9,090,234 B2 | 7/2015 | Johnson et al. |
| 9,092,986 B2 | 7/2015 | Salomonsson et al. |
| 9,126,525 B2 | 9/2015 | Lynam et al. |
| 9,140,789 B2 | 9/2015 | Lynam |
| 9,146,898 B2 | 9/2015 | Ihlenburg et al. |
| 9,174,574 B2 | 11/2015 | Salomonsson |
| 9,205,776 B2 | 12/2015 | Turk |
| 9,233,641 B2 | 1/2016 | Sesti et al. |
| 9,575,160 B1 | 2/2017 | Davis et al. |
| 9,599,702 B1 | 3/2017 | Bordes et al. |
| 9,689,967 B1 | 6/2017 | Stark et al. |
| 9,753,121 B1 | 9/2017 | Davis et al. |
| 10,071,687 B2 | 9/2018 | Ihlenburg et al. |
| 2010/0245066 A1 | 9/2010 | Sarioglu et al. |
| 2013/0002873 A1 | 1/2013 | Hess |
| 2013/0141578 A1 | 6/2013 | Chundrlik, Jr. et al. |
| 2013/0215271 A1 | 8/2013 | Lu |
| 2013/0222593 A1 | 8/2013 | Byrne et al. |
| 2013/0242099 A1 | 9/2013 | Sauer et al. |
| 2013/0258077 A1 | 10/2013 | Bally et al. |
| 2013/0278769 A1 | 10/2013 | Nix et al. |
| 2013/0298866 A1 | 11/2013 | Vogelbacher |
| 2013/0300869 A1 | 11/2013 | Lu et al. |
| 2013/0314503 A1 | 11/2013 | Nix et al. |
| 2014/0005907 A1 | 1/2014 | Bajpai |
| 2014/0025240 A1 | 1/2014 | Steigerwald et al. |
| 2014/0028852 A1 | 1/2014 | Rathi |
| 2014/0049646 A1 | 2/2014 | Nix |
| 2014/0052340 A1 | 2/2014 | Bajpai |
| 2014/0067206 A1 | 3/2014 | Pflug |
| 2014/0085472 A1 | 3/2014 | Lu et al. |
| 2014/0098229 A1 | 4/2014 | Lu et al. |
| 2014/0104426 A1 | 4/2014 | Boegel et al. |
| 2014/0138140 A1 | 5/2014 | Sigle |
| 2014/0139676 A1 | 5/2014 | Wierich |
| 2014/0152825 A1 | 6/2014 | Schaffner |
| 2014/0160276 A1 | 6/2014 | Pliefke et al. |
| 2014/0160291 A1 | 6/2014 | Schaffner |
| 2014/0168415 A1 | 6/2014 | Ihlenburg et al. |
| 2014/0168437 A1 | 6/2014 | Rother et al. |
| 2014/0211009 A1 | 7/2014 | Fursich |
| 2014/0218535 A1 | 8/2014 | Ihlenburg et al. |
| 2014/0226012 A1 | 8/2014 | Achenbach |
| 2014/0232869 A1 | 8/2014 | May et al. |
| 2014/0247352 A1 | 9/2014 | Rathi et al. |
| 2014/0247354 A1 | 9/2014 | Knudsen |
| 2014/0247355 A1 | 9/2014 | Ihlenburg |
| 2014/0293042 A1 | 10/2014 | Lynam |
| 2014/0293057 A1 | 10/2014 | Wierich |
| 2014/0307095 A1 | 10/2014 | Wierich |
| 2014/0309884 A1 | 10/2014 | Wolf |
| 2014/0313339 A1 | 10/2014 | Diessner |
| 2014/0320636 A1 | 10/2014 | Bally et al. |
| 2014/0320658 A1 | 10/2014 | Pliefke |
| 2014/0327772 A1 | 11/2014 | Sahba |
| 2014/0327774 A1 | 11/2014 | Lu et al. |
| 2014/0336876 A1 | 11/2014 | Gieseke et al. |
| 2014/0340510 A1 | 11/2014 | Ihlenburg et al. |
| 2014/0347486 A1 | 11/2014 | Okouneva |
| 2017/0222311 A1 | 8/2017 | Hess et al. |
| 2017/0254873 A1 | 9/2017 | Koravadi |
| 2017/0276788 A1 | 9/2017 | Wodrich |
| 2017/0315231 A1 | 11/2017 | Wodrich |
| 2017/0356994 A1 | 12/2017 | Wodrich et al. |
| 2018/0015875 A1 | 1/2018 | May et al. |
| 2018/0045812 A1 | 2/2018 | Hess |
| 2018/0231635 A1 | 8/2018 | Woehlte |
| 2019/0339382 A1 | 11/2019 | Hess et al. |

* cited by examiner

VEHICULAR FRONT CAMERA TESTING SYSTEM

CROSS REFERENCE TO RELATED APPLICATION

The present application claims the filing benefits of U.S. provisional application Ser. No. 62/802,267, filed Feb. 7, 2019, which is hereby incorporated herein by reference in its entirety.

FIELD OF THE INVENTION

The present invention relates generally to a vehicle vision system for a vehicle and, more particularly, to a system or method that tests a vehicular sensor of a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a testing system or method for testing vehicular sensors and vehicular sensing systems of a collision avoidance system without risking collision of the sensor(s) with a target object. The system includes a sensor support structure disposed at a vehicle. The sensor support structure includes a proximal end mounted at the vehicle, a distal end extending away from the vehicle, and a force providing element that provides a force to move the distal end of the sensor support structure. The system also includes a vehicular sensor disposed at the distal end of the sensor support structure and a control including electronic circuitry and associated software. The control is operable to control the force providing element to move the distal end of the sensor support structure. During testing of the vehicular sensing system while the vehicle travels along a path of travel and with the vehicular sensor approaching a target object, and responsive to determination that collision of the vehicular sensor with the target object is imminent, the control controls the force providing element to move the distal end of the sensor support structure and the vehicular sensor to avoid the collision with the target object.

These and other objects, advantages, purposes and features of the present invention will become apparent upon review of the following specification in conjunction with the drawings.

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide display, such as a rearview display or a top down or bird's eye or surround view display or the like.

When developing or prototyping vehicular sensors (e.g., a vehicular camera or radar sensor) for collision avoidance systems (e.g., autonomous emergency braking system), the system-under-test may not be capable of sufficiently braking the vehicle because the function is not yet implemented or not yet fully functional (e.g., the system is incomplete or still has flaws). In this scenario, when functional testing is conducted "open loop" (i.e., without braking), the sensor may collide with the test object (e.g., a crash dummy, barrier, vehicle, etc.) and damage the sensor and/or test object.

In accordance with the present invention, a system and method for testing collision avoidance systems or active pedestrian protection systems that prevents collisions between the sensors and the test object is provided. The system and method allow a sensor system (e.g., a camera system) mounted on a "breadboard" construction or structure to closely approach the test object (e.g., a crash dummy) without actually colliding with the test object. The system provides a sensor that may closely approach the test object at a high rate of speed (e.g., up to 80 kph or more) while still avoiding collision.

Figure 1:
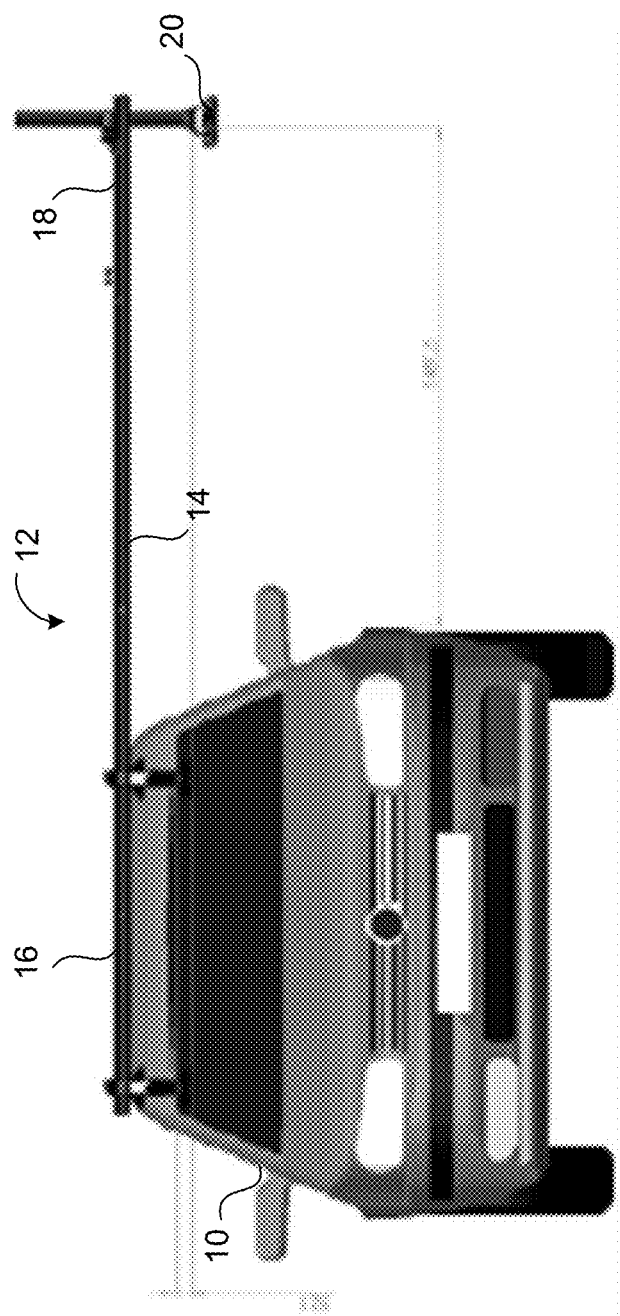
FIG. 1 is a plan view of a vehicle with a vision testing system that tests a camera in accordance with the present invention.
Figure 2:
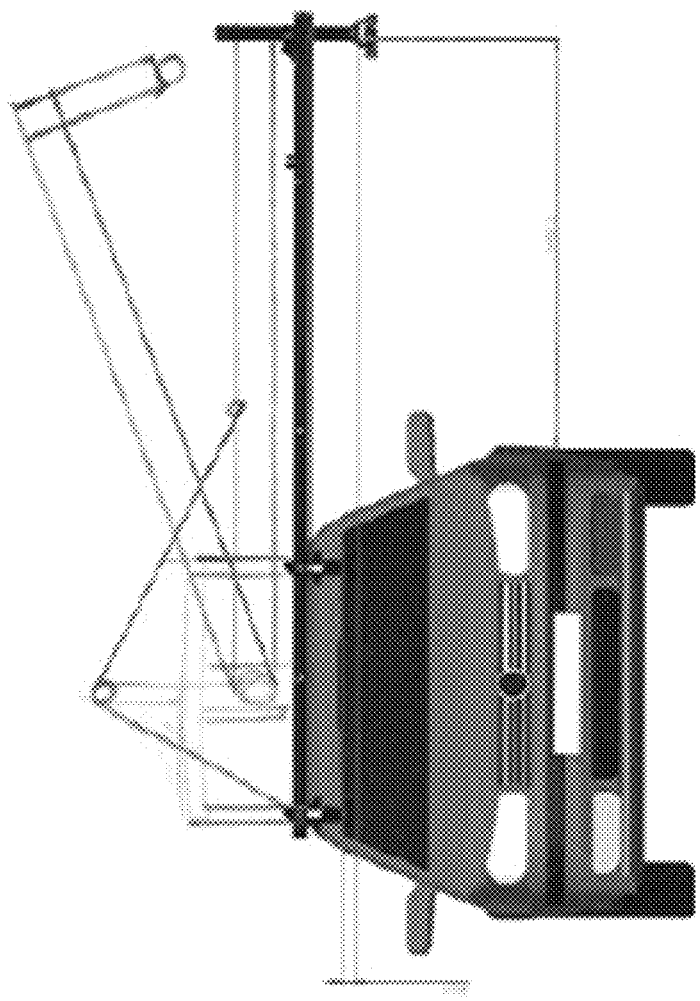
FIG. 2 is another plan view of a vehicle with a vision testing system that tests a camera in accordance with the present invention.
Figure 5B:
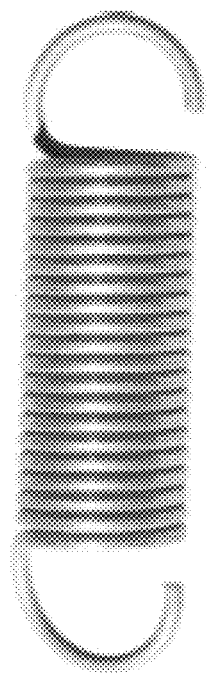
FIGS. 5A-5D are perspective views of exemplary swinging mechanisms of a vision testing system in accordance with the present invention.
Figure 5D:
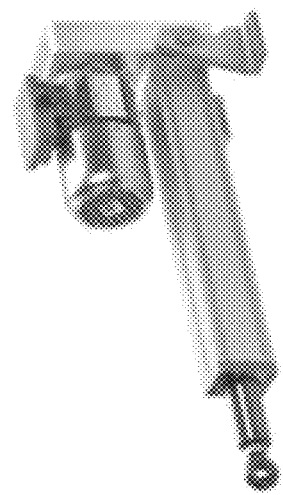
Figure 5A:
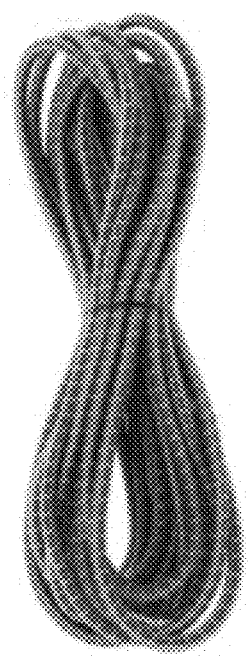
Figure 5C:
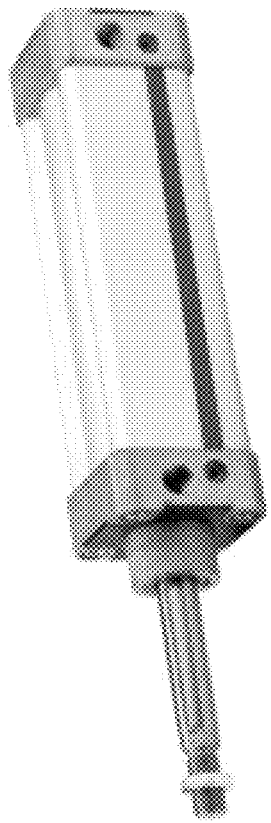

Referring now to FIG. 1, a vehicle 10 is equipped with testing system 12. The testing system 12 includes construction or structure 14 with a proximal end 16 disposed or mounted at the vehicle 10 and a distal end 18 extending away from the vehicle 10. A vehicular sensor 20 (e.g., a vehicular camera) is disposed at the distal end 18 of the structure 14. The structure also includes a force providing element (FIGS. 5A-5D). In some implementations, the force providing element swings the distal end 18 of the structure 14 either on a horizontal plane (FIG. 1) or a vertical plane (FIG. 2). That is, the force providing element may swing the distal end 18 of the structure 14 toward the front or rear of the vehicle on a plane generally perpendicular with the ground, or the force providing element may swing the distal end 18 of the structure 14 from a first position 22 away from the ground on a plane generally orthogonal to the ground to a second position 24. In some implementations, the distal end 18 may retract toward or extend away from the vehicle 10 (e.g., telescoping). The force providing element may include, for example, a bungee or elastic or shock cord or rope (FIG. 5A), a coil spring (FIG. 5B), a pneumatic cylinder (FIG. 5C), or an electric drive or motor (FIG. 5D).

Figure 3B:
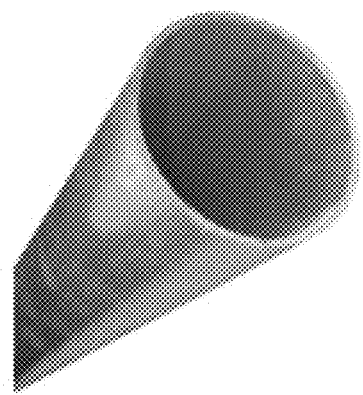
FIGS. 3A and 3B are perspective views of exemplary construction materials for a construction in accordance with the present invention.
Figure 3A:
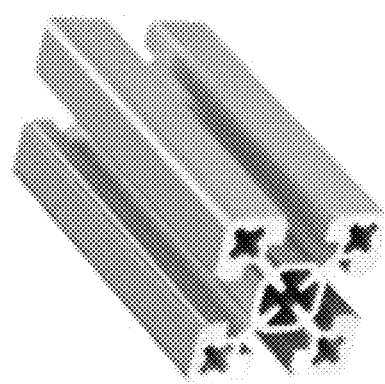
Figure 4B:
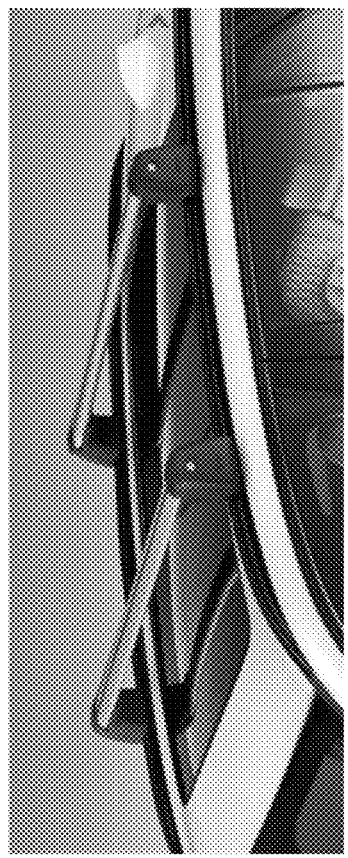
FIGS. 4A-4D are perspective views of exemplary roof mounts for the construction in accordance with the present invention.
Figure 4A:
Figure 4D:
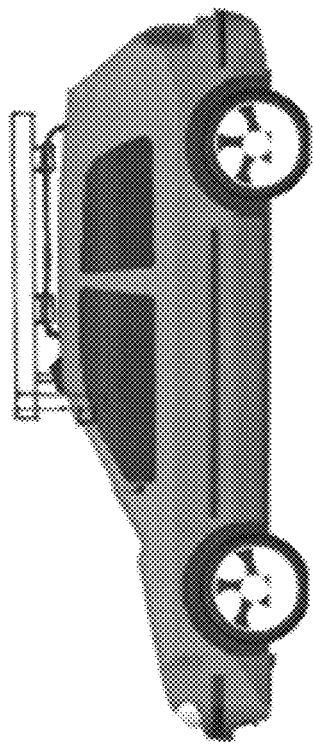
Figure 4C:
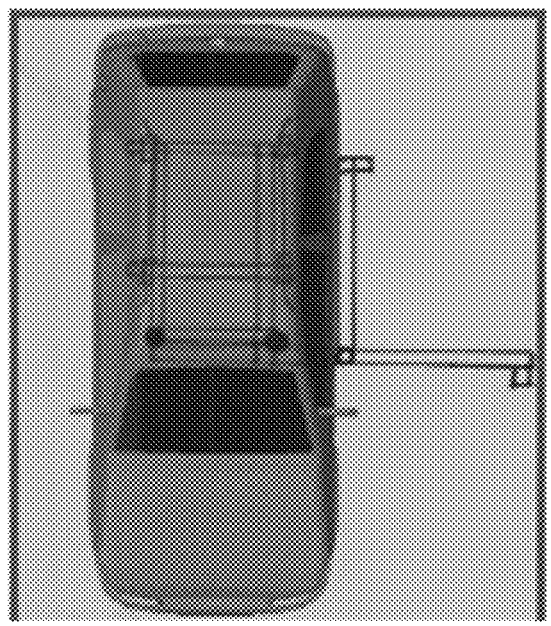

Referring now to FIGS. 3A and 3B, the structure 14 is preferably constructed from a lightweight yet strong material (e.g., aluminum). For example, the structure may include aluminum profiles (FIG. 3A) or aluminum tubes (FIG. 3B). Referring now to FIGS. 4A-4D, the proximal end 16 is disposed at the vehicle 10 and, in some examples, is mounted to the roof of the vehicle 10. The structure 14 may be mounted to the roof via, for example, a vacuum head or suction head (FIG. 4A) or via a roof rack (FIG. 4B). As illustrated in FIGS. 4C and 4D, two or more mounting methods may be combined to mount the proximal end to the vehicle, such as a combination of the vacuum head and roof rack.

Figure 6A:
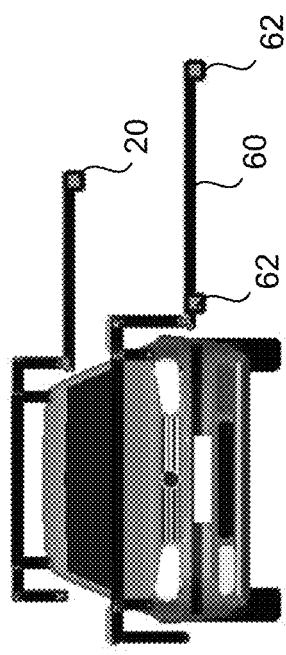
FIGS. 6A-6C are plan views of a radar testing system that tests a plurality of radar sensors in accordance with the present invention.
Figure 6B:
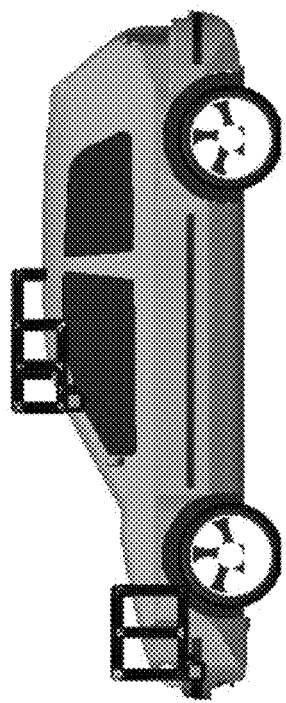
Figure 6C:
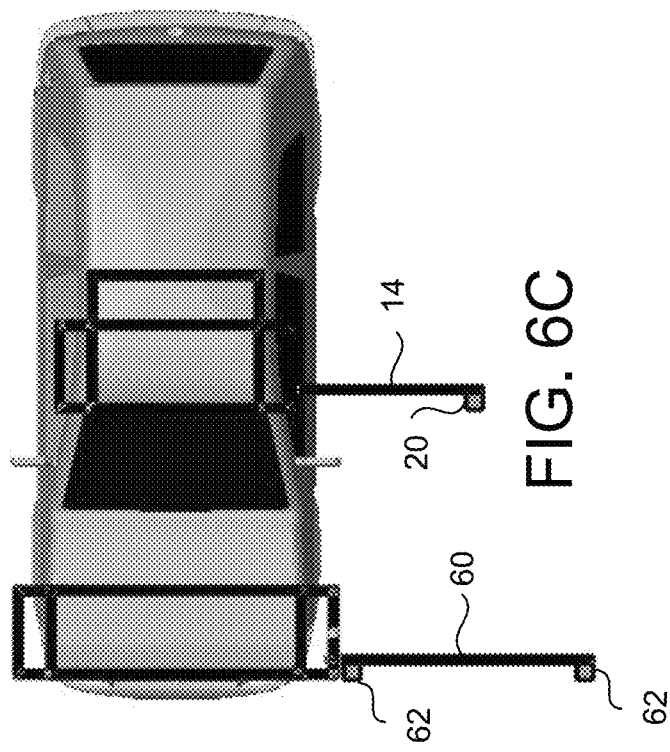

Referring now to FIGS. 6A-6C, a second structure 60 may be used to mount additional sensors. For example, the structure 60 may be disposed or mounted near the front of the vehicle (e.g., on or near the hood) to provide radar sensors 62 at a proper offset from the front facing camera 20. That is, the second structure 60 may ensure that the radar sensors 62 are the same distance from the mounted camera 20 as the distance between the camera(s) and radar sensor(s) when installed in a vehicle (such as when installed in a production vehicle at a vehicle assembly plant) to simulate the same or similar conditions the sensors experience when installed in the production vehicle.

Figure 7:
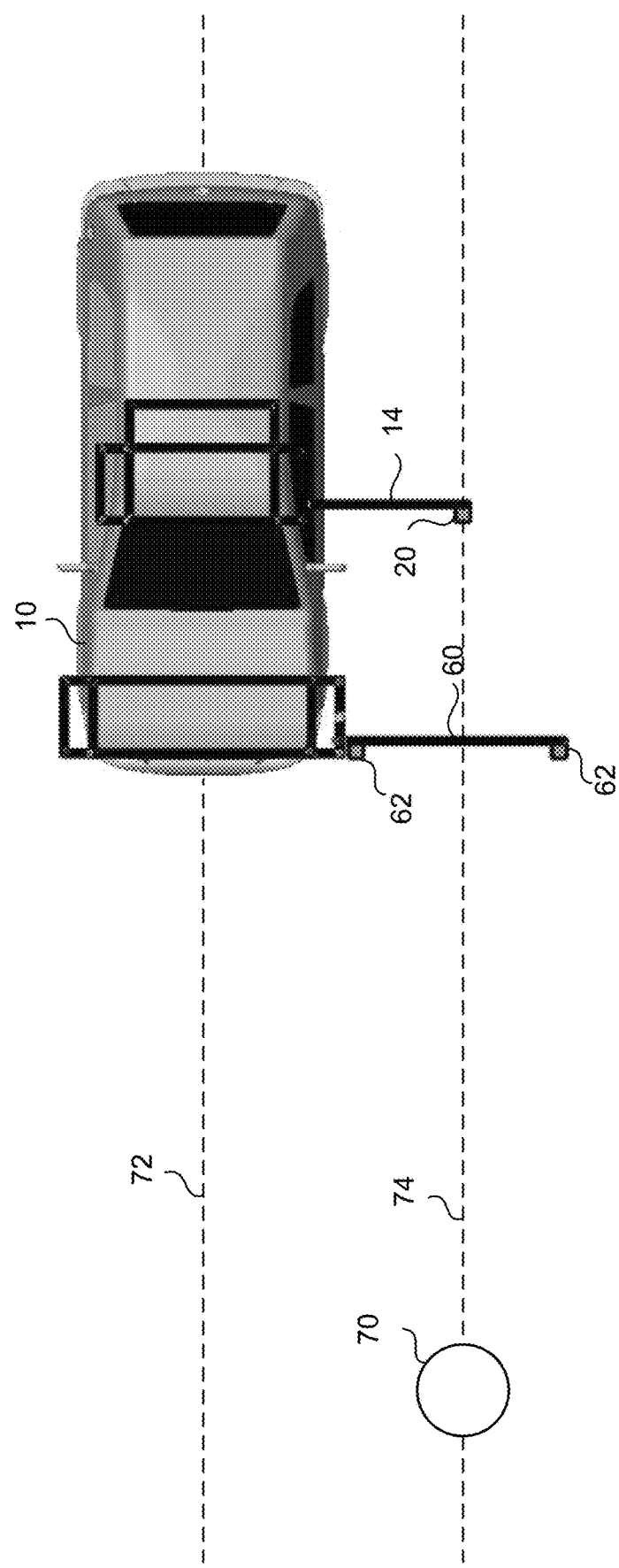
FIG. 7 is a plan view of the radar testing system of FIGS. 6A-6C and paths to a target object.

Referring now to FIG. 7, the system 12 includes one or more structures (e.g., structures 14, 60) that mount to a vehicle 10 and suspend one or more vehicle sensors 20, 62 (e.g., cameras, radar sensors, ultrasonic sensors, etc.) away from the vehicle 10. The vehicle may then drive toward a target object 70 (e.g., a crash test dummy) on a path 72 that is offset from the target object 70 such that the sensors are on a path 74 aligned with the target object 70. The suspended sensors 20, 62 approach the target object 70 in the same manner as if they were mounted in their typical locations on the vehicle 10 and the vehicle was aligned with the object. Then, prior to impact with the target object 70, a force providing element (e.g., a spring or motor) swings, rotates, or otherwise moves the structures or a portion of the structures such that the sensors are pulled out of line with the target object and avoid a collision with the target object. Thus, the present invention allows sensors to be tested in a realistic environment (i.e., actually approaching a physical target) without risk of collision (and the subsequent damage such a collision may cause).

The system 12 may include a processor or control including electronic circuitry and associated software (with the circuitry comprising a data processor) that receives a signal or command (e.g., from the test operator, from a remote sensor or processor, etc.) to activate or enable the force providing element. For example, a sensor may be placed along or near the path the vehicle travels prior to the target object. When the vehicle passes near the sensor, the sensor may trigger the force providing element (such as via wirelessly transmitting a signal that is received by a receiver of the system). Optionally, the system 12 includes or provides other sensors and/or is in communication with sensors disposed at the target object 70 (e.g., receives data from a sensor disposed at the target object) to determine a distance from the target object 70. When a threshold minimum distance is met, the control may activate or enable the force providing element. That is, the system 12 may continually track the distance to the target object 70 by measuring the distance to the target object or by measuring the distance the vehicle 10 has traveled, and when a threshold is met, the control activates the force providing element to swing or move the distal end of the one or more structures 14, 60 away from a collision with the target object 70.

For example, the vehicle may be traveling at a selected speed toward the target object and when the system determines that the vehicle or sensor is within, for example, 20 feet from the target object, the controller may control the force providing element to cause the support structure and sensor to move so that collision with the object (as the vehicle continues to travel toward and past the object) is avoided. The threshold distance may vary based on the speed that the vehicle is traveling. For example, when traveling at higher speeds (e.g., greater than 20 mph or greater than 40 mph), the threshold distance may be greater than when the vehicle is traveling at slower speeds (e.g., less than 10 mph), so that the force providing element has sufficient time to move the support structure and sensor out of the way to avoid impact with the object. The amount of force provided by the force providing element may similarly be variable based on the speed of the vehicle. For example, the force providing element (e.g., an electric motor) may increase the amount of force provided the higher the vehicle speed in order to more rapidly move the support structure and sensor out of the path with the target object.

The controller thus activates the force providing element and the force providing element operates to move the support structure and sensor to avoid collision with the target object. For example, for a force providing element that comprises a spring or shock cord or the like, the support structure may be latched in its use position (and biased towards its non-use or moved-away position via the spring or shock cord), whereby the controller may actuate or move a latch to release the support structure so that it moves the sensor to avoid collision with the object. In examples where the force providing element comprises a motor or solenoid or pneumatic cylinder or the like, the controller controls the force providing element and the force providing element operates to move the support structure so that it moves the sensor to avoid collision with the object.

The system 12 may include a damping element to protect the sensors 20, 62, structures 14, 60, and/or vehicle 10. That is, in order for the sensors 20, 62 to closely approach the target object 70 without colliding with the target object 70, the sensors 20, 62 may swing or move rapidly away from the target 70. To reduce the shock on the sensors and/or structure, a damping element may slow the movement after the sensors have cleared the collision path (e.g., to avoid an abrupt stop).

The vision system and/or control or processor and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352;

US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in International Publication Nos. WO 2010/144900; WO 2013/043661 and/or WO 2013/081985, and/or U.S. Pat. No. 9,126,525, which are hereby incorporated herein by reference in their entireties.

The system may utilize sensors, such as radar or lidar sensors or the like. The sensing system may utilize aspects of the systems described in U.S. Pat. Nos. 9,753,121; 9,689,967; 9,599,702; 9,575,160; 9,146,898; 9,036,026; 8,027,029; 8,013,780; 6,825,455; 7,053,357; 7,408,627; 7,405,812; 7,379,163; 7,379,100; 7,375,803; 7,352,454; 7,340,077; 7,321,111; 7,310,431; 7,283,213; 7,212,663; 7,203,356; 7,176,438; 7,157,685; 6,919,549; 6,906,793; 6,876,775; 6,710,770; 6,690,354; 6,678,039; 6,674,895 and/or 6,587,186, and/or International Publication Nos. WO 2018/007995 and/or WO 2011/090484, and/or U.S. Publication Nos. US-2018-0231635; US-2018-0045812; US-2018-0015875; US-2017-0356994; US-2017-0315231; US-2017-0276788; US-2017-0254873; US-2017-0222311 and/or US-2010-0245066, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular test system for testing a vehicular sensing system, the vehicular test system comprising:
a sensor support structure disposed at a vehicle, wherein the sensor support structure comprises a proximal end mounted at the vehicle, a distal end extending away from the vehicle, and a force providing element that provides a force to move the distal end of the sensor support structure;
a vehicular sensor disposed at the distal end of the sensor support structure;
a control comprising electronic circuitry and associated software, wherein the control is operable to control the force providing element to move the distal end of the sensor support structure; and
wherein, during testing of the vehicular sensing system while the vehicle travels along a path of travel and with the vehicular sensor approaching a target object, and responsive to determination that collision of the vehicular sensor with the target object is imminent, the control controls the force providing element to move the distal end of the sensor support structure and the vehicular sensor to avoid the collision with the target object.

2. The vehicular test system of claim 1, wherein the vehicular sensor comprises a vehicular camera.

3. The vehicular test system of claim 1, wherein the vehicular sensor comprises a vehicular radar sensor.

4. The vehicular test system of claim 1, wherein the vehicular sensor comprises a vehicular lidar sensor.

5. The vehicular test system of claim 1, wherein, when the force providing element moves the distal end of the sensor support structure, the distal end moves along a horizontal plane parallel to the ground toward the vehicle.

6. The vehicular test system of claim 1, wherein, when the force providing element moves the distal end of the sensor support structure, the distal end moves along a vertical plane perpendicular to the ground to move above the vehicle.

7. The vehicular test system of claim 1, wherein, when the force providing element moves the distal end of the sensor support structure, the distal end of the sensor support structure retracts towards the vehicle.

8. The vehicular test system of claim 1, comprising a damping element, wherein the damping element dampens the movement of the distal end after the force providing element moves the distal end of the sensor support structure.

9. The vehicular test system of claim 1, wherein the proximal end disposed at the vehicle is mounted at the vehicle using a vacuum head.

10. The vehicular test system of claim 1, wherein the proximal end disposed at the vehicle is mounted at the vehicle using a roof rack of the vehicle.

11. The vehicular test system of claim 1, wherein the force providing element comprises one selected from the group consisting of (i) a bungee cord, (ii) a spring, (iii) a pneumatic cylinder and (iv) an electric motor.

12. The vehicular test system of claim 1, comprising a second sensor support structure and a second vehicular sensor, wherein the second vehicular sensor is different than the vehicular sensor.

13. The vehicular test system of claim 12, wherein the sensor support structure and the second sensor support structure maintain a distance between the vehicular sensor and the second vehicular sensor that is the same as a distance between the vehicular sensor and the second vehicular sensor when installed at a production vehicle at a vehicle assembly plant.

14. The vehicular test system of claim 1, wherein the control determines distance between the vehicular sensor and the target object based on sensor data received from a remote sensor that is remote from the vehicle, and wherein the remote sensor has a field of sensing that encompasses the vehicle.

15. The vehicular test system of claim 14, wherein the remote sensor is disposed at the target object.

16. The vehicular test system of claim 14, wherein the control determines that collision of the vehicular sensor with the target object is imminent when the determined distance is less than a threshold distance.

17. The vehicular test system of claim 16, wherein the threshold distance is based at least in part on speed of the vehicle as the vehicle moves along the path of travel.

18. A vehicular test system for testing a vehicular sensing system, the vehicular test system comprising:
a first sensor support structure disposed at a vehicle, wherein the first sensor support structure comprises a proximal end mounted at the vehicle, a distal end extending away from the vehicle, and a force providing element that provides a force to move the distal end of the first sensor support structure;
a vehicular camera disposed at the distal end of the first sensor support structure;
a second sensor support structure disposed at the vehicle, wherein the second sensor support structure comprises a proximal end mounted at the vehicle and a distal end extending away from the vehicle, wherein the force providing element that provides a force to move the distal end of the second sensor support structure;
a vehicular radar sensor at the distal end of the second sensor support structure;
a control comprising electronic circuitry and associated software, wherein the control is operable to control the force providing element to move the distal ends of the first and second sensor support structures;
wherein, during testing of the vehicular sensing system while the vehicle travels along a path of travel and with the vehicular camera and the vehicular radar sensor approaching a target object, and responsive to determination that collision of the vehicular camera and the vehicular radar sensor with the target object is imminent, the control controls the force providing element to move the distal end of the first and second sensor support structures and the vehicular camera and the vehicular radar sensor to avoid the collision with the target object; and
wherein the first sensor support structure and the second sensor support structure maintain a distance between the vehicular camera and the vehicular radar sensor that is the same as a distance between the vehicular camera and the vehicular radar sensor when installed at a production vehicle at a vehicle assembly plant.

19. The vehicular test system of claim 18, wherein, when the force providing element moves the distal ends of the first and second sensor support structures, each distal end moves along a horizontal plane parallel to the ground toward the vehicle.

20. The vehicular test system of claim 18, wherein, when the force providing element moves the distal ends of the first and second sensor support structures, each distal end moves along a vertical plane perpendicular to the ground to move above the vehicle.

21. A vehicular test system for testing a vehicular sensing system, the vehicular test system comprising:
a sensor support structure disposed at a vehicle, wherein the sensor support structure comprises a proximal end mounted at the vehicle, a distal end extending away from the vehicle, and a force providing element that provides a force to move the distal end of the sensor support structure;
wherein the force providing element comprises one selected from the group consisting of (i) a bungee cord, (ii) a spring, (iii) a pneumatic cylinder and (iv) an electric motor;
a vehicular sensor disposed at the distal end of the sensor support structure;
a control comprising electronic circuitry and associated software, wherein the control is operable to control the force providing element to move the distal end of the sensor support structure;
wherein, during testing of the vehicular sensing system while the vehicle travels along a path of travel and with the vehicular sensor approaching a target object, and responsive to determination that collision of the vehicular sensor with the target object is imminent, the control controls the force providing element to move the distal end of the sensor support structure and the vehicular sensor to avoid the collision with the target object; and
wherein the control determines distance between the vehicular sensor and the target object based on sensor data received from a remote sensor that is remote from the vehicle, and wherein the remote sensor has a field of sensing that encompasses the vehicle.

22. The vehicular test system of claim 21, wherein the remote sensor is disposed at the target object.

\* \* \* \* \*